United States Patent [19]

Brelsford

[11] Patent Number: 5,215,407

[45] Date of Patent: Jun. 1, 1993

[54] PROCESS OF CLEANING OIL SPILLS AND THE LIKE

[76] Inventor: Jeffrey A. Brelsford, 105 Brunswick Pl., Lansdale, Pa. 19446

[21] Appl. No.: 417,740

[22] Filed: Oct. 5, 1989

[51] Int. Cl.$^5$ .......................... E02B 15/04; C02B 9/02
[52] U.S. Cl. .......................................... 405/63; 405/60; 210/242.4; 210/691; 210/924
[58] Field of Search ................... 405/60, 63; 210/691, 210/924, 242.4, 680

[56] References Cited

U.S. PATENT DOCUMENTS

| | | |
|---|---|---|
| 3,198,731 | 8/1965 | De Lew . |
| 3,484,371 | 12/1969 | Biegler et al. . |
| 3,539,013 | 11/1970 | Smith . |
| 3,556,698 | 1/1971 | Tully et al. . |
| 3,581,899 | 6/1971 | Hunter . |
| 3,657,125 | 4/1972 | Strickman . |
| 3,739,913 | 6/1973 | Bogosian ............................ 210/242.4 |
| 3,770,627 | 11/1973 | Alquist et al. . |
| 3,800,950 | 4/1974 | Hess et al. ........................ 210/924 X |
| 3,886,067 | 5/1975 | Miranda . |
| 3,904,528 | 9/1975 | Yocum ............................. 210/924 X |
| 3,941,694 | 3/1976 | Scott ................................ 210/925 X |
| 4,006,079 | 2/1977 | Langlois et al. ..................... 210/680 |
| 4,054,689 | 10/1977 | Calvin . |
| 4,151,078 | 4/1979 | Calvin ............................. 210/924 X |
| 4,183,984 | 1/1980 | Browers et al. . |
| 4,187,187 | 2/1980 | Turbeville ........................ 210/924 X |
| 4,332,854 | 6/1982 | Parker ............................ 210/924 X |
| 4,366,067 | 12/1982 | Golding et al. .................... 210/924 X |
| 4,481,113 | 11/1984 | Canevari .......................... 210/680 |
| 5,002,814 | 3/1991 | Knack et al. ..................... 210/242.4 X |
| 5,071,564 | 12/1991 | Stein et al. ....................... 210/680 |

FOREIGN PATENT DOCUMENTS

| | | | |
|---|---|---|---|
| 3326833 | 2/1985 | Fed. Rep. of Germany ...... | 210/924 |
| 2146311 | 3/1973 | France ............................... | 210/924 |
| 2053883 | 2/1981 | United Kingdom ................ | 210/924 |

OTHER PUBLICATIONS

Brochure: "New Insul Safe III fiber Glass Insulation", 6 pages, by CertainTeed Corporation.
Pigalog catalog (Spring 1989, vol. II, No. 2) 3 pages.
PIG Material Safety Data Sheets, 7 pages.
Brochure: "The SPC Solution", Sorbert Products Company, Inc., 4 pages.

Primary Examiner—Dennis L. Taylor
Assistant Examiner—John A. Ricci
Attorney, Agent, or Firm—John F. A. Earley; John F. A. Earley, III

[57] ABSTRACT

A process of cleaning spills of toxic or hazardous materials such as oil, antifreeze, gasoline, and the like from bodies of water, garage floors, roadways and the like, comprises spraying shredded fiberglass blowing wool composition particles onto the spill, absorbing the spill with the fiberglass blowing wool composition particles, and removing the fiberglass blowing wool composition particles and the spill absorbed by the fiberglass blowing wool composition particles. An absorbent composition for absorbing spills of toxic or hazardous materials comprises shredded fiberglass blowing wool particles, and cork and/or styrofoam particles dispersed with the fiberglass blowing wool particles. An absorbent sock for absorbing and for containing a spill of toxic or hazardous materials comprises an oil permeable tube, and shredded fiberglass blowing wool composition particles enclosed in the tube. Apparatus for controlling an oil slick on the surface of water comprises a craft for approaching the slick, a supply of a fiberglass blowing wool composition particles stored in the craft, and a dispensing unit on the craft for dispensing the particles onto the slick.

23 Claims, 2 Drawing Sheets

PROCESS OF CLEANING OIL SPILLS AND THE LIKE

BACKGROUND OF THE INVENTION

1. Field of the Invention

This invention relates to cleaning spills of toxic or hazardous materials, such as oil, antifreeze, gasoline and the like, and more particularly to a process of cleaning such spills on bodies of water, garage floors, and roadways. Further the invention relates to absorbent composition particles for absorbing toxic or hazardous material spills and to an absorbent sock or boom for absorbing spills and containing the area of spills.

2. Description of the Prior Art

Spills of petroleum, crude oil, fuel oil, and the like from ships present a serious water pollution problem as is illustrated by the oil spill disaster from a super-tanker in Valdez, Ak. in 1989.

The known techniques for containing and removing an oil slick from a body of water have proven to be unsatisfactory in many cases. For example, dispersants and detergents have an ecological drawback, and various absorbent materials used to sink the oil to the bottom of the ocean are also ecologically undesirable. Another known technique of removing the oil by igniting the oil slick is dangerous.

Further, due to logistics, many of the widely used techniques for containing an oil spill and for absorbing the spilled oil may not be put into use for up to five hours or more after an oil spill disaster occurs because the spill containing or removing apparatus may not arrive in time.

Similarly, spills of oil, antifreeze, gasoline, and other toxic or hazardous materials may occur from trucks transporting these materials, or in garages, or machine shops, or refineries, and such spills present safety, health and ecological problems, and they all present clean-up problems.

SUMMARY OF THE INVENTION

It is an object of this invention to provide a new process for cleaning spills of toxic or hazardous materials such as, but not limited to, oil, antifreeze, gasoline, and the like from bodies of water, garage floors, machine shop floors, refineries, roadways, and the like.

Another object is to provide an absorbent composition for absorbing toxic or hazardous materials such as oil, antifreeze, gasoline and the like.

Still another object of the invention is to provide an absorbent sock or boom for absorbing and for containing such toxic or hazardous materials.

Another object of the invention is to provide a new method for controlling the area of an oil slick on the surface of water.

Another object is to provide a new method for treating an oil slick within minutes of a spillage accident.

These and other objects are accomplished by providing a new process of cleaning up spills of toxic or hazardous materials such as oil, antifreeze, gasoline, and the like by spraying shredded fiberglass blowing wool composition particles onto the spill, absorbing the spill into the fiberglass blowing wool composition particles, and removing the fiberglass blowing wool composition particles and the spill absorbed by the fiberglass blowing wool composition particles.

Such an absorbent composition comprises shredded fiberglass blowing wool particles, and optionally cork and/or styrofoam particles dispersed in with the fiberglass blowing woo particles.

An absorbent sock or boom for absorbing and for containing a spill of toxic or hazardous material is also provided, and comprises a tube, shredded fiberglass blowing wool composition particles enclosed in the tube, and, optionally, cork and/or styrofoam particles dispersed in among the fiberglass blowing wool particles.

DETAILED DESCRIPTION

Figure 1:
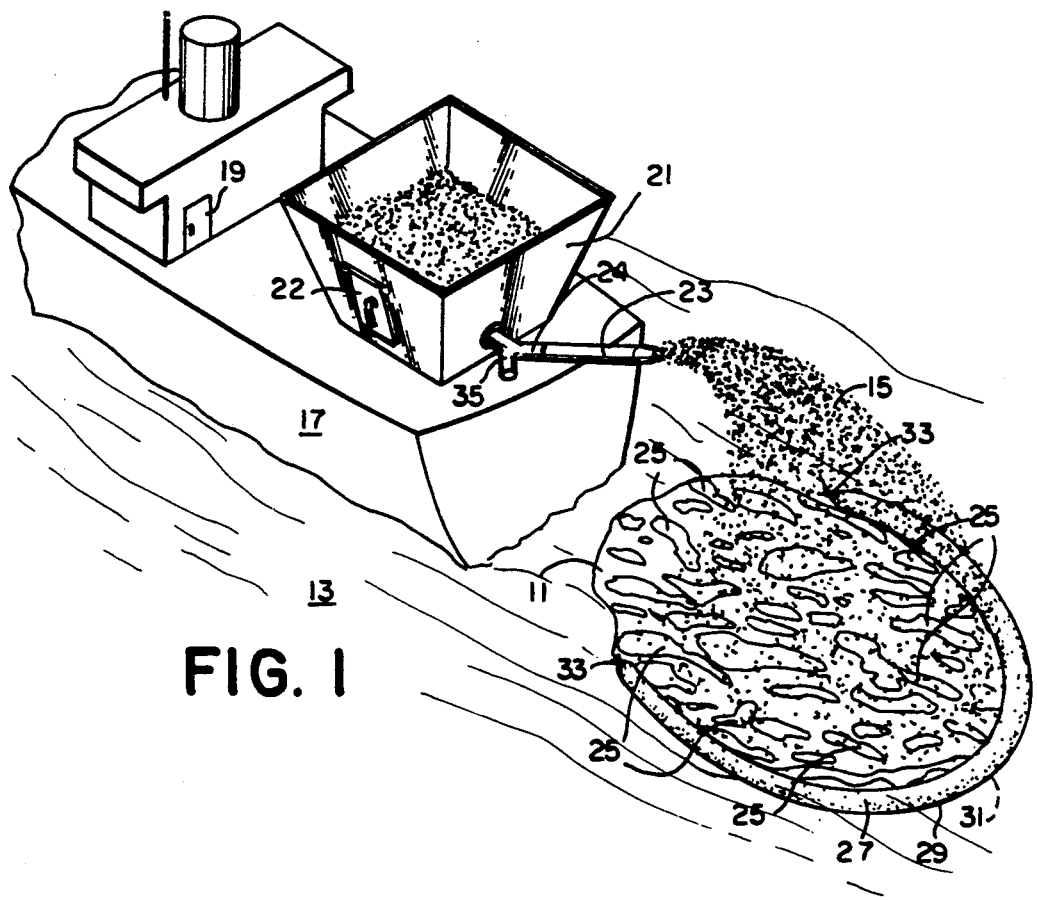
FIG. 1 is a perspective view of shredded fiberglass blowing wool composition particles being sprayed onto an oil slick from a ship.
Figure 2:
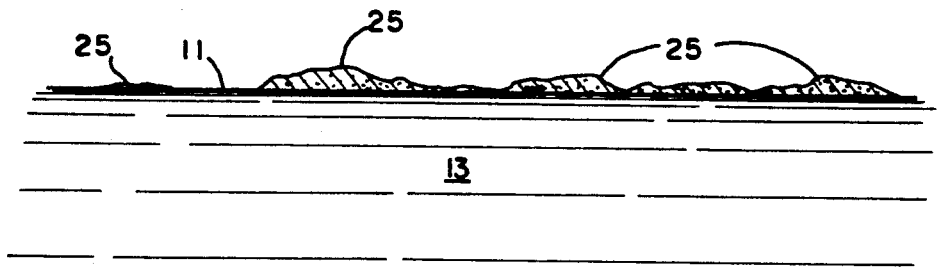
FIG. 2 is an elevational view of the fiberglass blowing wool composition particles lying on the oil spill and absorbing oil.

FIGS. 1 and 2 illustrate a process of cleaning hazardous materials such as oil spills 11 on bodies of water 13. The process comprises spraying particles 15 of a fiberglass blowing wool composition onto the oil spill 11, absorbing the oil 11 into the particles 15 of the fiberglass blowing wool composition, and removing the particles 15 and the oil 11 absorbed by particles 15 from the water 13.

Fiberglass blowing wool composition particles 15 are made of shredded fiberglass blowing wool such as CERTAINTEED INSUL-SAFE III fiberglass b owing insulation made by CertainTeed Corporation, Valley Forge, Pa., RICH-R fiberglass blowing insulation made by Manville, and THERMACUBE fiberglass blowing insulation made by Owens-Corning. Preferably, when treating oil spills 11 on bodies of water, particles of CERTAINTEED INSUL-SAFE III fiberglass blowing insulation are used since the CERTAINTEED INSUL-SAFE III fiberglass blowing insulation, unlike the RICH-R fiberglass blowing insulation and the THERMACUBE fiberglass blowing insulation, does not tend to absorb water.

Preferably, bundles of the fiberglass blowing wool are shredded into irregularly-shaped sphere-like particles having diameters of approximately ⅛ inch to 2 inches since this size particle is easily spread out over the oil spill 11 and quickly absorbs the oil. However, it is not necessary that the bundles of fiberglass blowing wool be shredded for the invention to be effective, and, if desired, entire bundles of unshredded fiberglass blowing wool may be added directly to the spill to absorb it.

Further, composition particles 15 may have particles of cork or styrofoam, or both cork and styrofoam, mixed in with them. In addition to absorbing oil, the presence of cork and/or styrofoam particles with composition particles 15 aids flotation of the oil-filled particles 15 since cork and styrofoam are buoyant in water, and more importantly, they stiffen the particles 15 so that composition particles 15 fight against being compressed, resulting in less oil escaping from oil-filled composition particles 15 as they are being removed from the water 13.

As shown in FIG. 1, composition particles 15 are sprayed onto oil spill 11 from a ship or boat 17 using a fiberglass blowing unit 21 that is portable and is releasably mounted on the ship 17. Exemplary of the fiberglass blowing unit 21 is a DL-5 Deluxe fiberglass blowing unit made by Unisil, Inc., Winter Haven, Fla., and disclosed in U.S. Pat. Nos. 3,085,834, 3,529,870, and 3,578,749, which are incorporated herein by reference. Bundles of fiberglass blowing wool, which may be stored in storage closets 19 or merely stacked alongside blowing unit 21, are placed into a bin of the fiberglass blowing unit 21 by using hinged door 22 or by dropping bundles into the top of the bin, there shredded, and the shredded fiberglass blowing wool particles are sprayed from a hose 23 extending from a spray outlet 24 of blowing unit 21 onto oil spill 11. Cork and/or styrofoam particles may be placed in the bin or hopper of the fiberglass blowing unit 21 with the particles of the fiberglass blowing wool, as desired.

Further, the bundles of fiberglass blowing wool, or the shredded fiberglass blowing wool particles in the hopper of blowing unit 21, may be sprayed with a mist of an antifreeze and water solution to reduce the dust given off as composition particles 15 are being sprayed onto the oil spill 11. Preferably, the antifreeze/water solution comprises 1 part antifreeze for every 4 parts water.

After composition particles 15 are sprayed onto oil spill 11, they begin to absorb the oil floating on the surface of the water 13, and, as shown in FIG. 2, the oil soaked composition particles 15 tend to clump together into gel-like clumps 25.

The oil soaked particles 15 are removed from the water 13 using appropriate known methods such as by using screens, nets, one's hands, brooms, skimmers and the like.

The following examples illustrate the invention and show how much in particles may be needed to absorb how much oil and the like.

EXAMPLE 1

A twelve-inch diameter bucket is filled with tap water that has been softened, and one-half quart of 10 W 40 oil is added to the water in the bucket. A handful of shredded fiberglass blowing wool particles is then added to the bucket and the shredded fiberglass blowing wool particles immediately begin to absorb the oil floating on the surface of the water in the bucket. Within approximately a minute, substantially all of the oil is absorbed by the shredded fiberglass blowing wool particles. The oil soaked shredded fiberglass blowing wool particles may be clumped together into a gel-like mass and removed from the bucket, leaving the bucket substantially oil-free.

EXAMPLE 2

Use the same steps as in example 1, except add one-half cup of salt to the water prior to the addition of the oil to simulate sea water in the bucket. Substantially the same results are obtained.

EXAMPLE 3

A twenty-four inch by twenty-four inch wash basin is filled with tap water that has been softened, and a quart of oil is poured onto the water in the wash basin. Then, two to three handfuls of shredded fiberglass blowing wool particles are added to the wash basin, and the shredded fiberglass blowing wool particles immediately begin to absorb the oil. Within approximately a minute, substantially all of the oil is absorbed by the shredded fiberglass blowing wool particles. The oil soaked shredded fiberglass blowing wool particles clump together into a gel-like mass and are removed from the wash basin, leaving the wash basin substantially oil-free.

EXAMPLE 4

Using the same steps as in example 3, except add one cup of salt to the water, to simulate salt water as in the ocean, prior to adding the oil to the water in the wash basin, substantially the same results are obtained.

EXAMPLE 5

An oil slick is prepared by adding 15.0 grams of Brass River crude oil to 400.0 grams of sea water held in a pan at room temperature. Then, 1.0 grams of shredded fiberglass blowing wool particles are added to the oil slick, and within approximately a minute substantially all of the oil is absorbed by the shredded fiberglass blowing wool particles. The oil soaked particles clump together, and the clumps are removed from the pan and weighed. Approximately 90.6% of the crude oil is absorbed by the fiberglass blowing wool particles as compared to substantially all of the 10W 40 motor oil in Examples 1-4.

EXAMPLE 6

Using the same steps as in example 5, except for adding 30.0 grams of crude oil, rather than 15.0 grams crude oil, and 2.0 grams of shredded fiberglass blowing wool particles, rather than 1.0 grams of shredded fiberglass blowing wool particles, substantially the same results are obtained with approximately 92.6% of the crude oil being absorbed by the fiberglass blowing wool particles.

EXAMPLE 7

Using the same steps as in example 5, except for adding 25.0 grams of 10 w 40 motor oil rather than 15.0 grams of crude oil, approximately 98.4% of the motor oil is absorbed by the fiberglass blowing wool particles, leaving the pan substantially free of the motor oil.

EXAMPLE 8

Using the same steps as in example 5, except for adding a shredded composition comprising 1.0 grams of fiberglass blowing wool particles and 0.25 grams of cork particles, rather than 1.0 grams of shredded fiberglass blowing wool particles alone, 14.9 of the 15.0 grams of the crude oil is absorbed.

EXAMPLE 9

Using the same steps as in example 5, except for adding a shredded composition comprising 1.0 grams of fiberglass blowing wool particles and 0.25 grams of styrofoam particles, rather than 1.0 grams of shredded fiberglass blowing wool particles alone, 14.8 of the 15.0 grams of crude oil is absorbed.

EXAMPLE 10

An ounce of shredded fiberglass blowing wool particles is placed in a 4 inch deep by 10 inch long by 4 inch wide pan, and an antifreeze liquid is poured directly onto the ounce of shredded fiberglass blowing wool particles. The first 20 fluid ounces of the antifreeze liquid is absorbed by the fiberglass blowing wool particles before the fiberglass blowing wool particles are completely saturated with the antifreeze liquid and additionally added antifreeze liquid begins to run off the fiberglass blowing wool particles.

EXAMPLE 11

Using the same steps as in example 10, except for adding diesel fuel for diesel motor vehicles rather than an antifreeze liquid, 20 fluid ounces of the diesel fuel is added to and absorbed by the ounce of shredded fiberglass blowing wool particles. Additionally added diesel fuel in excess of about the first 20 fluid ounces of diesel fuel added to the fiberglass blowing wool particles begins to run off the fiberglass blowing wool particles into the pan.

EXAMPLE 12

Using the same steps as in example 10, except for adding unleaded gasoline rather than an antifreeze liquid, 15 fluid ounces of the unleaded gasoline is added to and absorbed by the ounce of shredded fiberglass blowing wool particles. Additionally added unleaded gasoline in excess of about the first 15 fluid ounces of unleaded gasoline added to the fiberglass blowing wool particles begins to run off the fiberglass blowing wool particles into the pan.

EXAMPLE 13

Using the same steps as in example 10, except for adding 10 W 40 motor oil rather than an antifreeze liquid, 25 fluid ounces of the 10 W 40 motor oil is added to and absorbed by the ounce of shredding fiberglass blowing wool particles. Additionally added 10 W 40 motor oil in excess of about the first 25 fluid ounce of 10 W 40 motor oil added to the fiberglass blowing wool particles begins to run off the fiberglass blowing wool particles into the pan.

In addition to the tests of examples 1-13, other tests indicate that there are no significant changes in end result due to water temperatures varying from approximately 34 degrees Fahrenheit to approximately 80 degrees Fahrenheit.

After the oil-filled composition particles 15 are removed from the spill, they may be disposed of, as by burning them in an incinerator, or they may be treated to reclaim the oil. One method of reclaiming the oil is to squeeze the oil from the composition particles 15 into a container.

Referring to FIG. 1, there also is shown an absorbent boom or sock 27 for containing and for absorbing a spill of toxic or hazardous materials such as oil on a body of water. Boom 27 comprises a tube 29 stuffed with shredded fiberglass blowing wool composition particles 31.

The material of which tube 29 is made is permeable to the toxic or hazardous material and is preferably made of material such as nylon or polypropylene. Each end portion of tube 29 is closed off with clips or bands 33.

Fiberglass blowing wool composition particles 31, which are identical to composition particle 15, are made of shredded fiberglass blowing wool and optionally, may also contain cork and/or styrofoam particles. The presence of cork and/or styrofoam particles with composition particles 31 aids flotation of the oil filled composition particles 31, and more importantly, stiffens boom 27 so that boom 27 fights against being compressed, resulting in less oil escaping from oil-filled boom 27 when it is being removed from the spill after use. Boom 27 not only contains a spill by surrounding the spill or by blocking expansion of the spill, boom 27 also absorbs part of the spill.

Booms 27 may be prepared on board ship 17 by inserting an open end of tube 29 onto spray outlet 35 of fiberglass particle blowing unit 21, closing off the other end portion of tube 29 with a band 33, opening spray outlet 35, and filling tube 29 with fiberglass blowing wool composition particles 31 by blowing the particles 31 from unit 21 through spray outlet 35 into tube 29 to fill up the tube 29. After tube 29 is filled, spray outlet 35 is closed and the open end portion of tube 29 is closed off with a band 33.

A method of absorbing and of containing a spill of toxic or hazardous materials such as oil, antifreeze, gasoline, and the like from a body of water includes the steps of making a boom 27 by filling the nylon tube 29 with shredded fiberglass blowing wool composition particles 31 and closing off the end portions of tube 29 with clips or bands 33 to enclose the fiberglass blowing wool composition particles 31 in tube 29, and then placing boom 27 around a spill to contain the spill and absorb the spill material and prevent the spill from expanding beyond the containment area formed by the boom 27.

Figure 3:
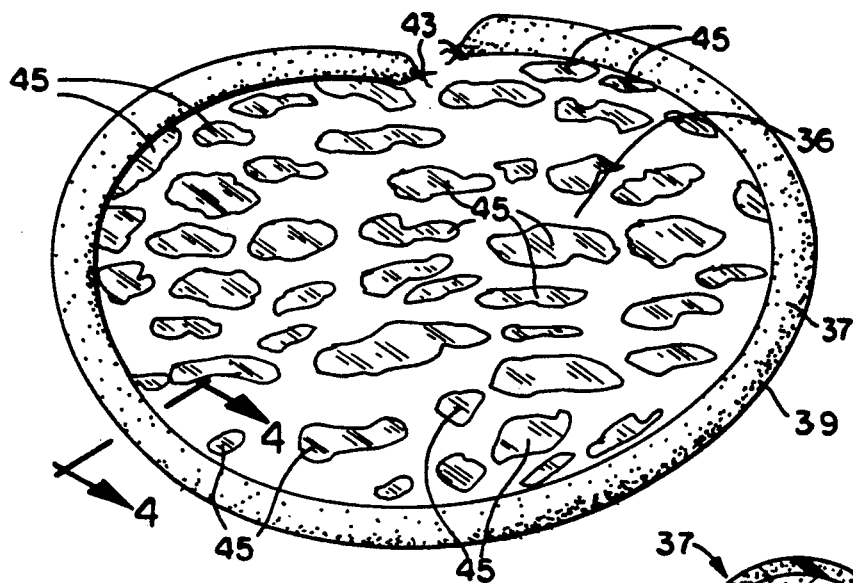
FIG. 3 is a view of an absorbent sock surrounding and containing an oil spill on a garage floor and shows a shredded fiberglass blowing wool composition particles absorbing the oil being contained by the sock
Figure 4:
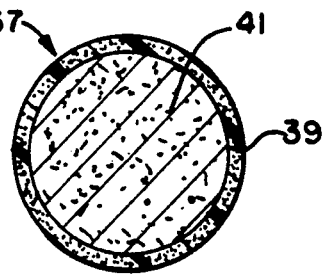
FIG. 4 is a view in section taken along the lines and arrows 4—4 of FIG. 3.

Turning to FIGS. 3 and 4, there is shown an absorbent sock or boom 37 for containing and for absorbing a spill of hazardous material such as oil from surfaces 38 such as roadways, garage floors, machine shop floors, and refinery floors. Sock or boom 37, which is identical to boom 27, comprises a tube 39 stuffed with shredded fiberglass b owing wool composition particles 41.

Tube 39 is permeable to the toxic or hazardous material and is preferably made of material such as nylon or polypropylene. Each end portion of tube 39 is closed off with clips or bands 43.

Fiberglass blowing wool composition particles 41, which are identical to composition particles 15, contain shredded fiberglass blowing wool particles and optionally, may also contain cork and/or styrofoam particles. The presence of cork and/or styrofoam particles in with composition particles 4 stiffens the sock 37 so that sock 37 fights against being compressed, resulting in less oil escaping from oil-filled sock 37 when it is being moved after use or if it is accidentally stepped on while in use. Sock 37 not only contains a spill by surrounding the spill and blocking expansion of the spill, sock 37 also absorbs part of the spill coming into contact with it.

With toxic or hazardous material spills that have a water base or that contain water, RICH-R fiberglass blowing insulation or THERMACUBE fiberglass blowing insulation is preferred over CERTAINTEED INSUL-SAFE III fiberglass blowing insulation since they both absorb some water along with the toxic hazardous materials.

Composition particles 41 also may be added directly to the spill surrounded by sock 37 to aid in absorbing the spill. The free shredded fiberglass blowing wool composition particles 41 absorb the spill, forming gel-like clumps 45, as shown in FIG. 3.

A method of absorbing and of containing a spill of toxic or hazardous materials such as oil, antifreeze, gasoline, and the like from surfaces such as roadways, garage floors, machine shop floors, and refinery floors includes preparing the sock 37 by filling the nylon tube 39 with shredded fiberglass blowing wool composition particles 41 and closing off the end portions of tube 39 with clips or bands 43 to enclose the fiberglass blowing wool composition particles 41 in tube 39. The sock 37 is then placed around a spill to absorb the spill and to contain the spill and prevent it from expanding beyond sock 37.

Figure 5:
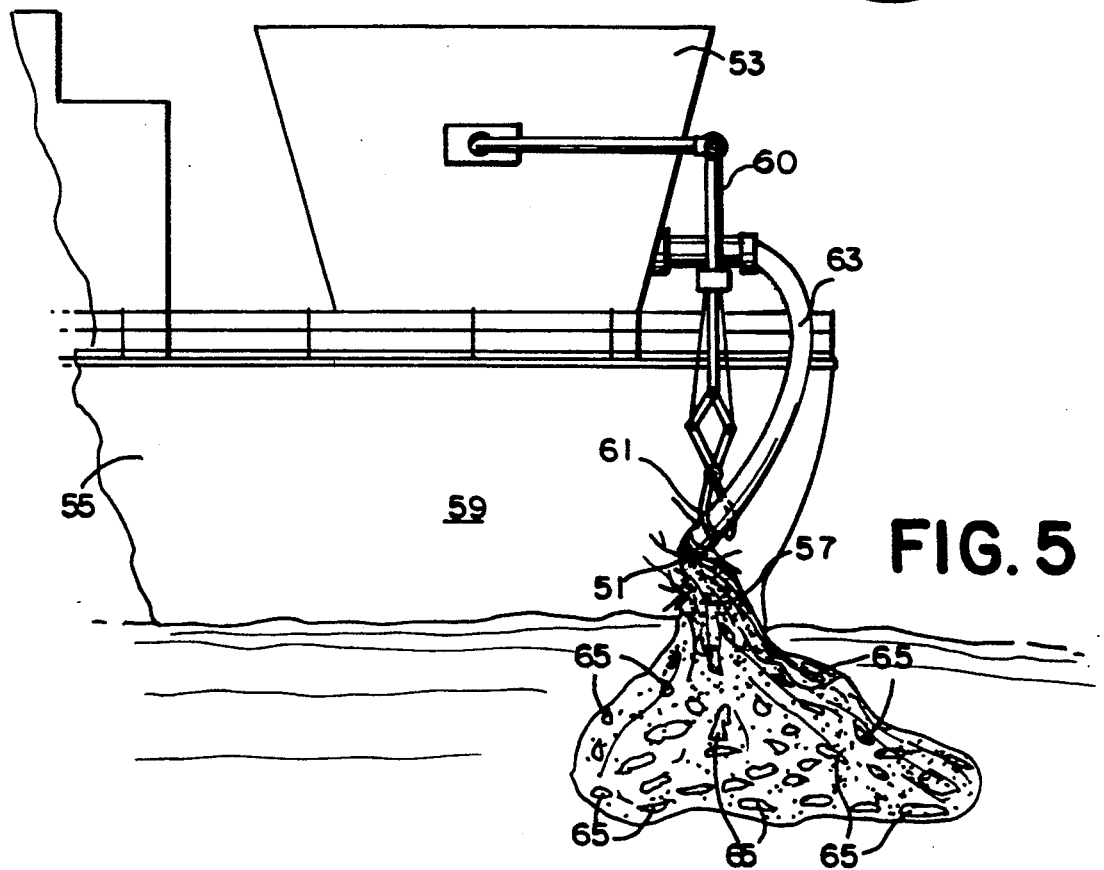
FIG. 5 is a side view in elevation of a shredded fiberglass blowing wool composition particles being sprayed onto oil as it spills from an opening in the hull of an oil tanker.

Turning now to FIG. 5, fiberglass blowing wool composition particles 51, which are identical to composition particles 15 and are made of shredded fiberglass blowing wool particles and optionally cork and/or styrofoam particles, are shown being sprayed from a fiberglass blowing unit 53 mounted on an oil tanker 55 directly onto oil 56 which is spilling from a hole or crack 57 in the hull 59 of the tanker 55. A crane 60 is used to position the end portion 61 of a hose 63, extending from fiberglass blowing unit 53, at the crack or hole 57. As soon as the shredded fiberglass blowing wool composition particles 51 come into contact with the escaping oil, they begin to absorb the oil, and the composition particles 51 with the absorbed oil start to clump together into gel-like clumps 65.

Other examples of toxic or hazardous waste include hospital waste, chemical spills, industrial spills and nuclear waste.

ADVANTAGES

The invention provides for the treatment of an oil spill on a body of water within minutes after its occurrence. By providing an oil tanker with a fiberglass blowing unit 21 or 53 and a supply of fiberglass blowing wool composition particles 15, 31 or 51, cleaning up and treatment of an oil spill may begin almost immediately after its occurrence, thereby limiting the size of the spill.

Further, due to the relatively small size and portability of the fiberglass blowing unit 21 or 53, the components used in the invention may be easily stored out of the way when not in use. Further, smaller ships and other craft may be provided with one or more fiberglass blowing units to help handle spills.

The fiberglass blowing wool used in the fiberglass blowing wool composition particles 15, 31, 41, 51, is substantially non-combustible, non-corrosive, odor-free, and decay-resistant.

Agitation due to rough seas does not substantially dislodge absorbed oil from the fiberglass blowing wool composition particles.

The fiberglass blowing wool composition particles are inexpensive as compared to other compositions used in known techniques of cleaning spills.

I claim:

1. A process of cleaning spills of toxic or hazardous materials such as oil, antifreeze, gasoline, and the like from bodies of water, garage floors, roadways and the like, comprising
spraying unbonded shredded fiberglass blowing wool composition particles onto the spill,
absorbing the spill into the shredded fiberglass blowing wool composition particles, and
removing the soaked shredded fiberglass blowing wool composition particles and the spill absorbed therein.

2. The process of claim 1,
the fiberglass blowing wool particles being irregularly shaped spheres and having a particle size in a range of approximately ⅛ inch to 2 inches in diameter.

3. The process of claim 1,
said removing of the fiberglass blowing wool composition particles and the absorbed spill being accomplished by scooping with screens, nets or hand, or by using brooms or skimmers.

4. The process of claim 1, further including
reclaiming the spill absorbed by the fiberglass blowing wool composition particles by squeezing the soaked fiberglass blowing wool composition particles.

5. The process of claim 1, further including
spraying the fiberglass blowing wool particles with an antifreeze/water solution prior to spraying the shredded fiberglass blowing wool particles onto the spill.

6. An absorbent composition for absorbing spills of toxic or hazardous materials such as oil, antifreeze, gasoline, and like, comprising
shredded fiberglass blowing wool particles, and
means for absorbing the spill and for stiffening the composition so that the composition fights against being compressed so that less of the absorbed spill escapes from the composition when it is being removed from the spill,
said means including
cork particles dispersed in with the fiberglass blowing wool particles.

7. The absorbent composition of claim 5, further including
a spray coating of antifreeze/water solution on the particles.

8. An absorbent composition for absorbing spills of toxic or hazardous materials such as oil, antifreeze, gasoline, and the like, comprising
shredded fiberglass blowing wool particles, and
means for absorbing the spill and for stiffening the composition so that the composition fights against being compressed so that less of the absorbed spill escapes from the composition when it is being removed from the spill,
said means including
styrofoam particles dispersed in with the fiberglass blowing wool particles.

9. The absorbent composition of claim 8, further including
a spray coating of an antifreeze/water solution on the particles.

10. An absorbent sock for absorbing or containing a spill of toxic or hazardous materials such as oil, antifreeze, gasoline, and the like, comprising
a hollow tube, said tube being permeable to the toxic or hazardous materials and being made of nylon or polypropylene, and
unbonded, shredded fiberglass blowing wool composition particles enclosed in the tube.

11. Apparatus for controlling an oil slick on the surface of water, comprising
a craft for traversing the slick,
a supply of fiberglass blowing wool composition particles stored on the craft in position for being dispersed,
shredding means on the craft for shredding the fiberglass blowing wool particles to form unbonded, shredded fiberglass blowing wool particles, and
dispensing means on the craft for dispensing the unbonded, shredded fiberglass blowing wool particles onto the slick.

12. The apparatus of claim 11, further including removal means for removing the fiberglass blowing wool composition particles and the oil absorbed by the fiberglass blowing wool composition particles from the surface of the water.

13. The apparatus of claim 11,
said dispensing means including
a fiberglass blowing unit mounted on the craft.

14. The apparatus of claim 13,
the fiberglass blowing unit being portable.

15. The apparatus of claim 13,
the fiberglass blowing unit having a hose through which the fiberglass blowing wool composition is sprayed, and further including
a crane for positioning the end of the hose at the mouth of the oil leak.

16. A process of cleaning spills of toxic or hazardous materials such as oil, antifreeze, gasoline, and the like from bodies of water, garage floors, roadways and the like, comprising
spraying a substance onto the spill, the substance consisting essentially of unbonded, shredded fiberglass blowing wool composition particles,
absorbing the spill into the shredded fiberglass blowing wool composition particles, and
removing the soaked shredded fiberglass blowing wool composition particles and the spill absorbed therein.

17. An absorbent composition for absorbing spills of toxic or hazardous materials such as oil, antifreeze, gasoline, and the like, consisting essentially of
shredded fiberglass blowing wool particles, and
means for absorbing the spill and for stiffening the composition, so that the composition fights against being compressed so that less of the absorbed spill escapes from the composition when it is being removed from the spill, said means including
cork particles or styrofoam particles dispersed in with the fiberglass blowing wool particles.

18. An absorbent sock for absorbing or containing a spill of toxic or hazardous materials such as oil, anti-freeze, gasoline, and the like, comprising
a hollow tube, said tube being permeable to the toxic or hazardous materials and being made of nylon or polypropylene, and
a substance enclosed in the tube, the substance consisting essentially of unbonded, shredded fiberglass blowing wool composition particles.

19. Apparatus for controlling an oil slick on the surface of water, comprising
a craft for traversing the slick,
a supply of an absorbent composition consisting essentially of fiberglass blowing wool composition particles stored on the craft in position for being dispersed,
shredding means on the craft for shredding the fiberglass blowing wool particles to form unbonded, shredded fiber glass blowing wool particles, and
dispensing means on the craft for dispensing the unbonded, shredded fiberglass blowing wool particles onto the slick.

20. A process of cleaning spills of toxic or hazardous materials such as oil, anti-freeze, gasoline, and the like from bodies of water, garage floors, roadways and the like, comprising
spraying shredded fiberglass blowing wool composition particles onto the spill, the spray composition particles including means for absorbing the spill and for stiffening the spray composition particles so that the composition particles fight against being compressed so that less of the spill escapes from the composition particles as they are being removed from the water, said means including cork particles,
absorbing the spill into the shredded fiberglass blowing wall composition particles, and
removing the soaked shredded fiberglass blowing wool composition particles and the spill absorbed therein.

21. A process of cleaning spills of toxic or hazardous materials such as oil, anti-freeze, gasoline, and the like from bodies of water, garage floors, roadways and the like comprising
spraying shredded fiberglass blowing wool composition particles onto the spill, the spray composition particles including means for absorbing the spill and for stiffening the spray composition particles so that the composition particles fight against being compressed so that less of the spill escapes from the composition particles as they are being removed from the water, said means including styrofoam particles,
absorbing the spill in to the shredded fiberglass blowing wool composition particles, and
removing the soaked shredded fiberglass blowing wool composition particles and the spill absorbed therein.

22. An absorbent sock for absorbing and for containing a spill of toxic or hazardous materials such as oil, anti-freeze, gasoline, and the like, comprising
a hollow tube, and
shredded fiberglass blowing wool composition particles enclosed in the tube, the composition particles including means for absorbing the spill and for stiffening the composition particles so that the composition particles fight against being compressed so that less of the absorbed spill escapes from the composition particles when they are being removed from the spill.
said means including cork particles.

23. An absorbent sock for absorbing and containing a spill of toxic or hazardous material such as oil, anti-freeze, gasoline, and the like, comprising
a hollow tube, and
shredded fiberglass blowing wool composition particles enclosed in the tube, the fiberglass blowing wool composition particles including means for absorbing the spill and for stiffening the composition particles so that the composition particles fight against being compressed so that less of the absorbed spill escapes from the composition particles when they are being removed from the spill,
said means including styrofoam particles.

* * * * *